United States Patent

Nagai et al.

[11] Patent Number: 5,810,915

[45] Date of Patent: Sep. 22, 1998

[54] AQUEOUS INK COMPOSITION AND IMAGE FORMATION METHOD USING THE SAME

[75] Inventors: Kiyofumi Nagai, Machida; Akiko Konishi, Yokohama; Masayuki Koyano, Sagamihara, all of Japan

[73] Assignee: Ricoh Company, Ltd., Tokyo, Japan

[21] Appl. No.: 820,240

[22] Filed: Mar. 18, 1997

Related U.S. Application Data

[63] Continuation of Ser. No. 638,636, Apr. 26, 1996, abandoned.

[30] Foreign Application Priority Data

Apr. 28, 1995 [JP] Japan ................................. 7-129553

[51] Int. Cl.$^6$ .................................................. C09D 11/02
[52] U.S. Cl. ..................................... 106/31.43; 106/31.49; 106/31.58; 106/31.59
[58] Field of Search ............................. 106/31.27, 31.43, 106/31.46, 31.49, 31.58, 31.59

[56] References Cited

U.S. PATENT DOCUMENTS

| | | | |
|---|---|---|---|
| 4,306,875 | 12/1981 | De Feo et al. ......................... | 106/22 D |
| 4,647,310 | 3/1987 | Shimada et al. ...................... | 106/22 K |
| 4,711,668 | 12/1987 | Shimada et al. ...................... | 106/22 K |
| 4,793,860 | 12/1988 | Murakami et al. .................... | 106/22 K |
| 5,108,502 | 4/1992 | Pawlowski et al. ................... | 106/22 K |
| 5,290,346 | 3/1994 | Fujioka ................................. | 106/22 D |
| 5,431,720 | 7/1995 | Nagai et al. .......................... | 106/20 R |
| 5,514,208 | 5/1996 | Nagai et al. .......................... | 106/22 H |
| 5,622,550 | 4/1997 | Konishi et al. ....................... | 106/31.48 |

*Primary Examiner*—Helene Klemanski
*Attorney, Agent, or Firm*—Cooper & Dunham LLP

[57] ABSTRACT

An aqueous ink composition includes a dye component which contains a water-soluble xanthene dye or a water-soluble phthalocyanine dye, each of which includes a moiety of formula (I) when the water-soluble dye is in the form of a free acid,

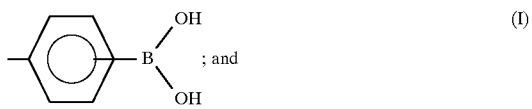

a surfactant. By use of this aqueous ink composition, a method of forming images on an image receiving medium is performed which includes the step of ejecting the aqueous ink composition in the form of droplets by the application of thermal or mechanical energy thereto onto an image receiving medium with a Stöckigt size degree of 3 seconds or more as defined in the Japanese Industrial Standards P-8122.

31 Claims, No Drawings

AQUEOUS INK COMPOSITION AND IMAGE FORMATION METHOD USING THE SAME

This is a Continuation of application Ser. No. 638,636, filed Apr. 26, 1996, now abandoned.

BACKGROUND OF THE INVENTION

Field of the Invention

The present invention relates to an aqueous ink composition, more particularly to an aqueous ink composition which is suitable for ink-jet printing, with excellent characteristics as a color ink for use with plain paper. The present invention also relates to a method of forming images by use of such an aqueous ink composition.

Discussion of Background

Ink-jet printers have been widely utilized in recent years because of the advantages of low noise and low running cost, and color printers capable of producing color images on a sheet of plain paper have also been placed on the market.

An ink compound for use in such color printer is generally composed of a coloring agent dispersed or dissolved in water, a wetting agent which is a polyhydric alcohol or an ether thereof, and water. Furthermore, when necessary, additives such as a mildewproofing agent may also be contained.

However, it is extremely difficult to obtain a color ink composition which is satisfactory with respect to the requirements such as color reproduction, water-resistance, light-resistance, drying characteristics, freeness of image blurring, and ink-ejection reliability, In particular, when color images are produced by a color ink-jet printer, the image quality is apt to deteriorate in image portions in a secondary color, such as red, green or blue obtained by superimposing two colors, even though the image quality of color images in a primary color such as yellow, magenta or cyan scarcely deteriorates.

In the case where an ink is deposited on a sheet of paper for image formation and dried without using any image fixing unit, it is necessary to improve the drying characteristics of the ink by increasing the penetrating property of the ink through the paper, as described in Japanese Laid-Open Patent Application 55-29546. In such a case, the ink tends to spread on the paper and obtained images are significantly blurred.

In Japanese Patent Publication 60-23793, there is described that dialkylsulfosuccinic acid, when used as a surfactant in an ink composition, is capable of improving the drying characteristic of the ink composition, with minimal deterioration of image quality, but has the problems that the diameter of a picture element of the obtained image remarkably varies depending upon the kind of image-receiving sheet to be used therewith, and that the decrease in image density of the printed images is considerable. In addition, this surfactant has another problem that it is decomposed under an alkaline condition and therefore the activating effect thereof is lost during the storage of the ink composition.

Japanese Laid-Open Patent Application 56-57862 discloses an ink composition comprising a strong basic material. Such an ink composition is effective for improvement of the penetration of the ink into a rosin-sized acidic paper, but not effective for a paper sized with an alkyl ketene dimer or alkenyl sulfosuccinic acid. Furthermore, even in the case of the acidic paper, the above-mentioned ink composition is not effective for a two-color-superimposed portion thereof.

Japanese Laid-Open Patent Application 1-203483 discloses a recording ink composition comprising a polyhydric alcohol derivative and pectin. In this ink composition, pectin is contained as a thickening agent to prevent the blurring of ink on the paper, However, when this ink composition is used in an ink-jet printer, the ejection of the ink composition from the nozzles of the printer is unstable when the printing operation is resumed after intermission because pectin is a nonionic material having hydroxyl groups as hydrophilic groups.

Furthermore, it has been tried to improve dyes themselves so as to have both color reproduction and water-resistance improved, However, it is still extremely difficult to obtain a dye which has improved water-resistance and highly reliable color reproduction performance.

Japanese Laid-Open Patent Application 5-194476 discloses an ink composition comprising, for example, an ammonium salt of a carboxyl-group-introduced xanthene dye. This ink composition has excellent water-resistance, but its performance is not always reliable when used in an ink-jet printer with a stationary head, The inventors of the present invention also have investigated various magenta dyes and proposed a magenta ink composition, for instance, in Japanese Laid-Open Patent Application 64-6237, as an ink composition having satisfactory water-resistance and reliability. However, the color tone produced by this ink composition, when used on plain paper, is not always satisfactory.

As cyan dyes, carbonyl-group-introduced phthalocyanine derivatives are proposed for use in ink compositions in Japanese Laid-Open Patent Application 63-3047 and also in Japanese Laid-Open Patent Application 1-126381 and Japanese Laid-Open Patent Application 6-93196. However, the ink composition proposed in the former Japanese Laid-Open Application 63-3047 does not have satisfactory reliability, while those in the latter two Japanese Laid-Open Patent Applications 1-126381 and 6-93196 do not have satisfactory water-resistance.

Furthermore, conventional anionic dyes are made water-soluble by introduction of sulfonic group or carboxylic group.

Japanese Laid-Open Patent Application 5-179152 discloses boronic-acid-group-introduced azo dyes as being novel dyes for ink-jet printing with satisfactory water-resistance and water solubility.

More specifically, in this Japanese Laid-Open Patent Application, there are disclosed azo dyes in which a boronic-acid-group introduced aryl group is bonded through an azo bond in the azo dyes.

Such azo dyes are useful as black dyes, but are not suitable as color dyes. This is because such azo dyes tend to coagulate when deposited on a sheet of paper, and sufficient water solubility and colorfulness cannot be securely obtained by such introduction of boronic acid group, particularly on plain paper.

The above Japanese Laid-Open Patent Application neither teaches nor suggests specific structures of phthalocyanine dyes and xanthene dyes with boronic acid group being introduced thereinto.

Furthermore, the relationship between the structure of a dye and the water-resistance thereof has been conventionally studied, but extensive studies have not been made concerning the relationship between the deterioration of image quality caused by, for instance, blurring of an ink, and the structure of a dye used in the ink.

SUMMARY OF THE INVENTION

Accordingly, it is therefore a first object of the present invention to provide an aqueous ink composition comprising a water-soluble dye, which is suitable for ink-jet printing, capable of forming images with improved color tone or colorfulness and water-resistance on plain paper, with minimized ink-spreading.

A second object of the present invention is to provide an aqueous magenta ink composition with excellent characteristics suitable for ink-jet printing.

A third object of the present invention is to provide an aqueous cyan ink composition with excellent characteristics suitable for ink-jet printing.

A fourth object of the present invention is to provide an aqueous ink composition comprising a cyan or magenta dye with excellent water solubility.

A fifth object of the present invention is to provide an aqueous ink composition with excellent penetrating property by use of a particular anionic surfactant.

A sixth object of the present invention is to provide an aqueous ink composition with excellent preservation stability by specifying a counter ion in the above-mentioned anionic surfactant.

A seventh object of the present invention is to provide an aqueous ink composition with excellent penetrating property by use of a particular nonionic surfactant.

An eighth object of the present invention is to provide an aqueous ink composition with improved preservation stability and penetrating property by stabilizing the interaction between the above-mentioned surfactant and dye employed therein.

A ninth object of the present invention is to provide an aqueous ink composition with improved preservation stability by specifying the value of a particular physical property thereof.

A tenth object of the present invention is to provide a method of forming images by use of the above-mentioned aqueous ink compositions.

The first object of the present invention can be achieved by an aqueous ink composition comprising a dye component comprising a water-soluble dye selected from the group consisting of a water-soluble xanthene dye and a water-soluble phthalocyanine dye, each of which includes a moiety of formula (I) when the water-soluble dye is in the form of a free acid,

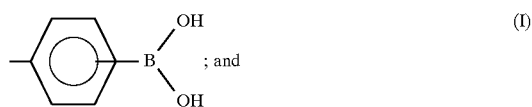

a surfactant.

More specifically, in the water-soluble dye component for use in the present invention, a boronic-acid-group-introduced aryl group is introduced into conventional dyes other than azo dyes, that is, without through an azo bond, whereby unconventionally excellent performance, particularly when used on plain paper, can be obtained.

The second object of the present invention can be achieved by the same aqueous ink composition as mentioned in the first object, provided that the dye component comprises at least one water-soluble xanthene dye selected from the group consisting of:

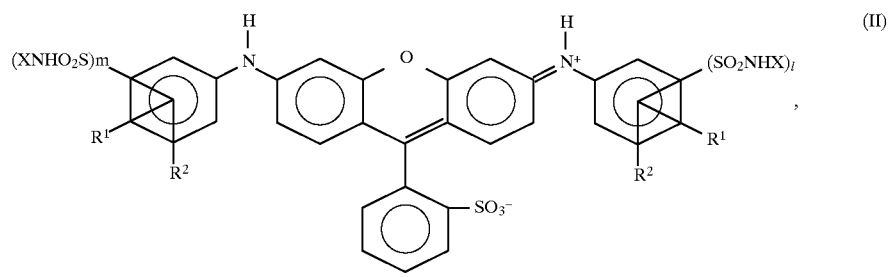

and

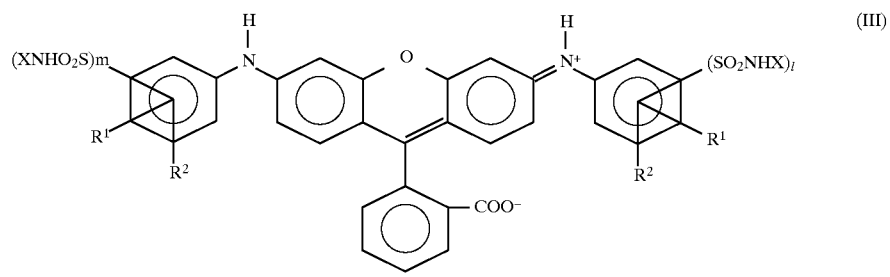

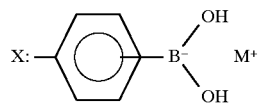

wherein $M^+$ is a cation selected from the group consisting of an alkali metal cation, a quaternary ammonium cation, an alkanolamine cation, and a quaternary phosphonium cation; $R^1$ and $R^2$ each is selected from the group consisting of hydrogen, an alkyl group having 1 to 4 carbon atoms and a halogen; and l and m each is an integer of 0 or 1, provided that l and m cannot be 0 at the same time.

The third object of the present invention can be achieved by the same aqueous ink composition as mentioned in the first object, provided that the dye component comprises at least one phthalocyanine dye selected from the group consisting of:

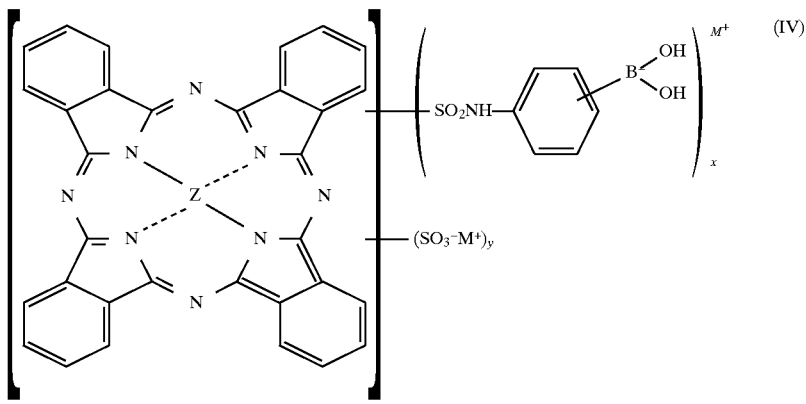

wherein $1 < x+y \leq 4$; Z is selected from the group consisting of hydrogen, Cu, Ni, Fe and Co; $M^+$ is a cation selected from the group consisting of an alkali metal cation, a quaternary ammonium cation, an alkanolamine cation, and a quaternary phosphonium cation; and

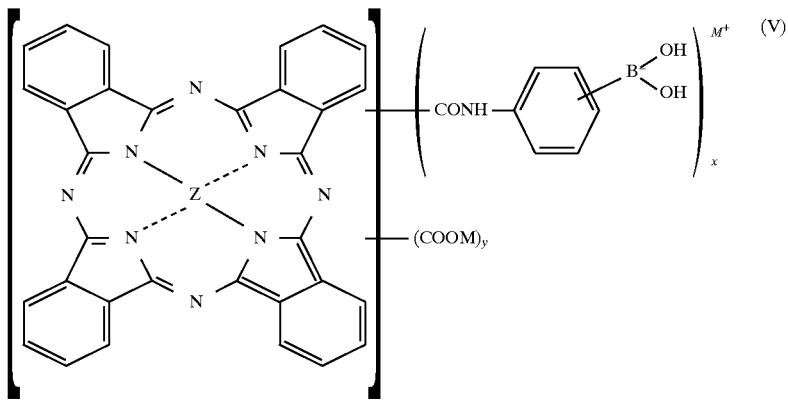

wherein $x+y \leq 8$; Z is selected from the group consisting of hydrogen, Cu, Ni, Fe and Co; $M^+$ is a cation selected from the group consisting of an alkali metal cation, a quaternary ammonium cation, an alkanolamine cation, and a quaternary phosphonium cation.

The fourth object of the present invention can be achieved by the same aqueous ink composition as those mentioned in the second and third objects of the present invention, provided that as the counter ion of each of the dyes, represented by $M^+$, any of the following cations is employed:

(A) an alkali metal cation selected from the group consisting of $Na^+$ and $Li^+$;

(B) a quaternary ammonium cation represented by $M^+$ is a cation represented by formula (VI-1):

wherein $R^3$ to $R^6$ each is selected from the group consisting of hydrogen, an alkyl group having 1 to 4 carbon atoms, and a halogenated alkyl group having 1 to 4 carbon atoms.

(C) an alkanolamine represented by formula (VI-2)

wherein at least one of $R^{13}$ to $R^{16}$ is a hydroxyl alkyl group having 1 to 4 carbon atoms, and the other is selected from the group consisting of hydrogen, an alkyl group having 1 to 4 carbon atoms and a halogenated alkyl group having 1 to 4 carbon atoms; and (D) a quaternary phosphonium cation represented by M' is a cation represented by formula (VI-3):

wherein $R^{23}$ to $R^{26}$ each is selected front the group consisting of hydrogen, an alkyl group having 1 to 4 carbon atoms, a hydroxy alkyl group having 1 to 4 carbon atoms, and a halogenated alkyl group having 1 to 4 carbon atoms.

The fifth object of the present invention can be achieved by the same aqueous ink compositions as those mentioned in the first, second, third and fourth objects of the present invention, provided that as the surfactant, there is employed a polyoxyethylene alkyl ether acetate of formula (VII):

$$R^7-O-(CH_2CH_2O)_m CH_2COOM \qquad (VII)$$

wherein $R^7$ is an alkyl group having 6 to 14 carbon atoms which may be branched; m is an integer of 3 to 12; $M^+$ is a cation selected from the group consisting of an alkali metal cation, a quaternary ammonium cation, an alkanolamine cation, and a quaternary phosphonium cation, which surfactant is added in such an amount that the surface tension of the aqueous ink composition is 50 mN/m or less; or a dialkylsulfosuccinate of formula (VIII):

wherein $R^8$ is a branched alkyl group having 5 to 7 carbon atoms; $M^+$ is a cation selected from the group consisting of an alkali metal cation, a quaternary ammonium cation, an alkanolamine cation, and a quaternary phosphonium cation, which surfactant is added in such an amount that the surface tension of the aqueous ink composition is 50 mN/m or less.

The six object of the present invention can be achieved by the same aqueous ink compositions as those mentioned in the fifth object of the present invention, provided that the counter ion of each dye, represented by M', is the alkali metal cation selected from the group consisting of $Na^+$ and $Li^+$; the quaternary ammonium cation represented by the previously mentioned formula (VI-1); the alkanolamine cation quaternary represented by the previously mentioned formula (VI-2); or the quaternary phosphonium action represented by the previously mentioned formula (VI-2).

The seventh object of the present invention can be achieved by the same aqueous ink compositions as in the first, second, third and fourth objects of the present invention, provided that as the surfactant, there is employed a compound of formula (IX):

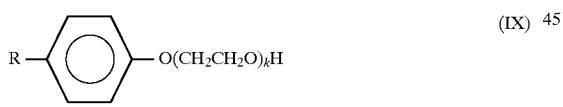

wherein R is an alkyl group having 6 to 14 carbon atoms, which may be branched; and k is an integer of 5 to 12, which surfactant is added in such an amount that the surface tension of the aqueous ink composition is 50 mN/m or less; or a compound of formula (X):

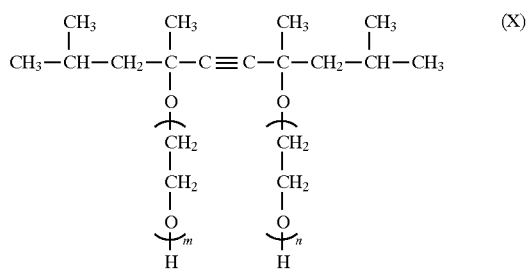

wherein m and n each is an integer of 0 to 40, which surfactant is added in such an amount that the surface tension of the aqueous ink composition is 50 mN/m or less.

The eighth object of the present invention can be achieved by the same aqueous ink compositions as in the above seventh object of the present invention, provided that urea or a urea derivative is added thereto.

The ninth object of the present invention can be achieved by the same aqueous ink compositions as in above first, second, third, fourth, fifth, sixth, seventh and eighth objects of the present invention, provided that the pH therefor is adjusted so as to be in the range of 6 to 11.

The tenth object of the present invention can be achieved by a method of forming images on an image receiving medium, comprising the step of ejecting any of the above aqueous ink compositions of the present invention in the form of droplets by the application of thermal or mechanical energy thereto onto an image receiving medium with a Stöckigt size degree of 3 seconds or more as defined in the Japanese Industrial Standards P-8122.

DESCRIPTION OF THE PREFERRED EMBODIMENTS

Magenta dyes and cyan dyes for use in the present invention can be easily synthesized from conventional xanthene dyes and phthalocyanine dyes.

For example, a xanthene dye of the following formula (II-1), which is an example of xanthene dyes for use in the present invention, can be easily synthesized by chlorosulfonating a xanthene compound of the following formula (II-E) and reacting the thus chlorosulfonated xanthene compound with a compound of the following formula (I-E):

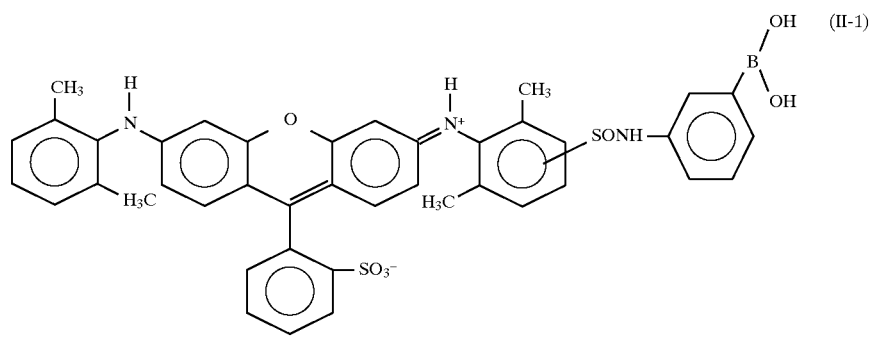

-continued

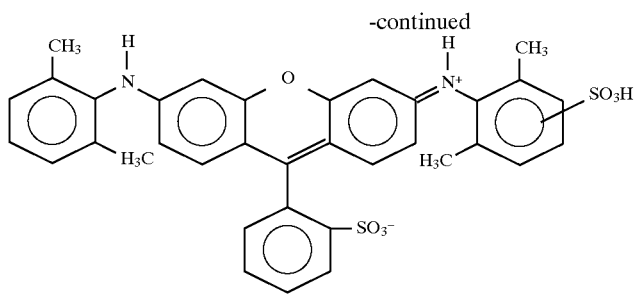

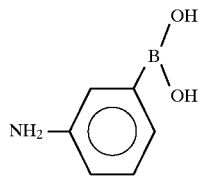

It is extremely difficult to introduce a boronic acid group directly into the skeletons of xanthene dyes and phthalocyanine dyes.

In the present invention, in order to increase the penetration performance of the aqueous ink composition thereof, there van be added thereto as an anionic surfactant a polyoxyethylene alkyl ether acetate of formula (VII):

$$R^7-O-(CH_2CH_2O)_m CH_2COOM \qquad (VII)$$

wherein $R^7$ is an alkyl group having 6 to 14 carbon atoms which may be branched; m is an integer of 3 to 12; $M^+$ is a cation selected from the group consisting of an alkali metal cation, a quaternary ammonium cation, an alkanolamine cation, and a quaternary phosphonium cation; or a dialkyl-sulfosuccinate of formula (VIII):

wherein $R^8$ is a branched alkyl group having 5 to 7 carbon atoms; $M^+$ is a cation selected from the group consisting of an alkali metal cation, a quaternary ammonium cation, an alkanolamine cation and a quaternary phosphonium cation, in such an amount that the surface tension of the aqueous ink composition is reduced to 50 mN/m or less, whereby the wetting performance of the aqueous ink composition to the surface of a sheet of paper is improved, and the penetration rate of the aqueous Ink composition into the paper is increased.

In the present invention, when a water-soluble dye of the following formula (II), (III), (IV) or (V) is employed as the dye component for the aqueous ink composition, the deterioration of images printed by the aqueous ink composition is extremely minimized:

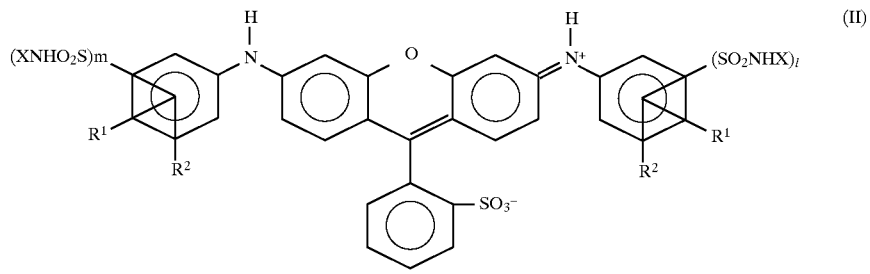

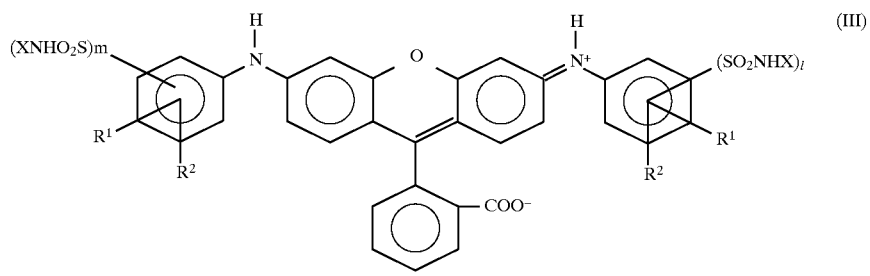

wherein $M^+$ is a cation selected from the group consisting of an alkali metal cation, a quaternary ammonium cation, an alkanolamine cation, and a quaternary phosphonium cation; $R^1$ and $R^2$ each is selected from the group consisting of hydrogen, an alkyl group having 1 to 4 carbon atoms and a halogen; and l and m each is an integer of 0 or $^1$, provided that l and m cannot be 0 at the same time.

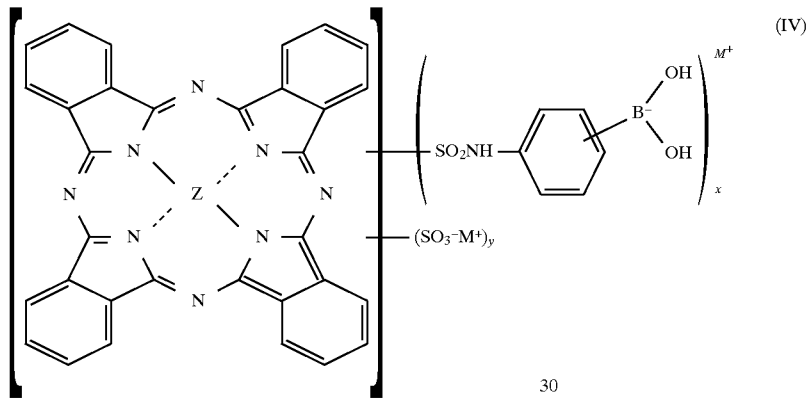

wherein $1<x+y \leq 4$; Z is selected from the group consisting of hydrogen, Cu, Ni, Fe and Co; $M^+$ is a cation selected from the group consisting of an alkali metal cation, a quaternary ammonium cation, an alkanolamine and a quaternary phosphonium cation; and

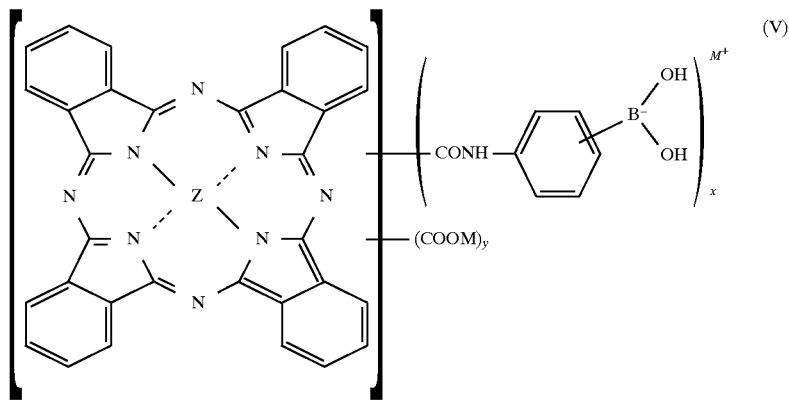

wherein $x+y \leq 8$; Z is selected from the group consisting of hydrogen, Cu, Ni, Fe and Co; $M^+$ is a cation selected from the group consisting of an alkali metal cation, a quaternary ammonium cation, an alkanolamine cation, and a quaternary phosphonium cation, It is considered that this is because when any of the above-mentioned dye components is used, the viscosity of the aqueous ink composition is increased by protons supplied from the surface of the paper, so that the spreading of the aqueous ink composition is further reduced.

Furthermore, in the present invention, there can be obtained an aqueous ink composition-on with excellent solubility stability when any of the above-mentioned water-soluble dyes of formulae (II), (III), (IV) and (V) is employed, and as a counter cation therefor, there is employed lithium cation, the quaternary ammonium cation represented by the previously mentioned formula (VI-1), the alkanolamine cation represented by the previously mentioned formula (VI-2) or the quaternary phosphonium cation represented by the previously mentioned formula (VI-3).

Furthermore, the surface tension of the aqueous ink composition of the present invention can be reduced to 50 mN/m or less, whereby the wetting performance of the aqueous ink composition to the surface of a sheet of paper is improved, and the penetration rate of the aqueous ink composition into the paper is increased, by adding thereto as a nonionic surfactant a polyoxyethylene alkylphenyl ether of the following formula (IX):

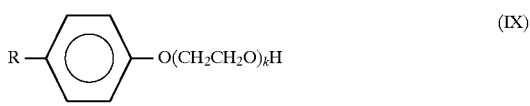

wherein R is an alkyl group having 6 to 14 carbon atoms, which may be branched; and k is an integer of 5 to 12, which surfactant is added in such an amount that the surface tension of the aqueous ink composition is 50 mN/m or less; or an acetylene glycol surfactant of formula (X):

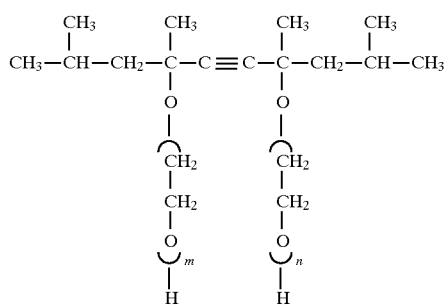

(X)

wherein m and n each is an integer of 0 to 40, which surfactant is added in such an amount that the surface tension of the aqueous ink composition is 50 mN,/m or less.

Further, when the water-soluble dye of the previously mentioned formula (II), (III), (IV) or (V) is employed as the dye component for the above aqueous ink composition, the deterioration of images printed by the aqueous ink composition is extremely minimized.

Furthermore, when urea or a urea derivative such as hydroxyethyl urea or dihydroxyethyl urea is added to the aqueous ink composition, in addition to the above surfactant of formula (IX) or formula (X), the interaction between the dye and the nonionic surfactant is weakened, and the association of the dye molecules is loosened, whereby the penetration performance, ejection stability and extended preservation stability of the aqueous ink composition can be significantly improved.

It is preferable that urea or such a urea derivative be added to the aqueous ink composition in an amount in the range of 0.1 wt. % to 5 wt. % of the entire weight of the aqueous ink composition in order to obtain the effect thereof sufficiently, without changing the viscosity thereof when water is evaporated from the aqueous ink composition.

When the pH of the aqueous ink composition of the present invention is set in the range of 6 to 11, high preservation stability can be obtained.

Most of copy papers and other recording papers used in offices have a pH of 5 to 6.

When the aqueous ink composition of the present invention is ejected in the form of droplets from a nozzle with an ejection diameter of 20 to 60 μm at an ejection speed of 5 to 20 m/s, with an ejection amount of 10 ng to 160 ng, onto a sheet of plain paper with a Stöckigt size degree of 3 seconds or more as defined in the Japanese industrial Standards P-8122, serving as an image-receiving medium to form images thereon, images with high quality and high resolution can be recorded.

in the case where the dialkylsulfosuccinate of formula (VIII) is used as surfactant in the aqueous ink composition with the pH thereof being 9 or more, the dialkylsulfosuccinate tends to be decomposed, so that it is preferable that the pH be in the range of 6 to 9 when this surfactant is employed.

It is preferable that the amount of the surfactant of formula (VII) or the surfactant (VIII) be in the range of 0.05 to 10 wt. % of the entire weight of the aqueous ink composition, depending upon the ink characteristics required by a printer system employed, in order to impart the desired penetration property to the aqueous ink composition.

When the amount of the surfactant of formula (VII) or formula (VIII) added is less than 0.05 wt. %, ink spreading tends to occur at the boundaries of two-color-superimposed portions; while when the added amount thereof is more than 10 wt. %, the reliability of the printing performance of the aqueous ink composition tends to be lowered since the surfactant is apt to be separated from the ink composition at low temperatures, and the dye contained therein is also separated.

Specific examples of the dyes of formulae (II), (III), (IV) and (V) for use in the present invention are shown below in the respective free acid forms:

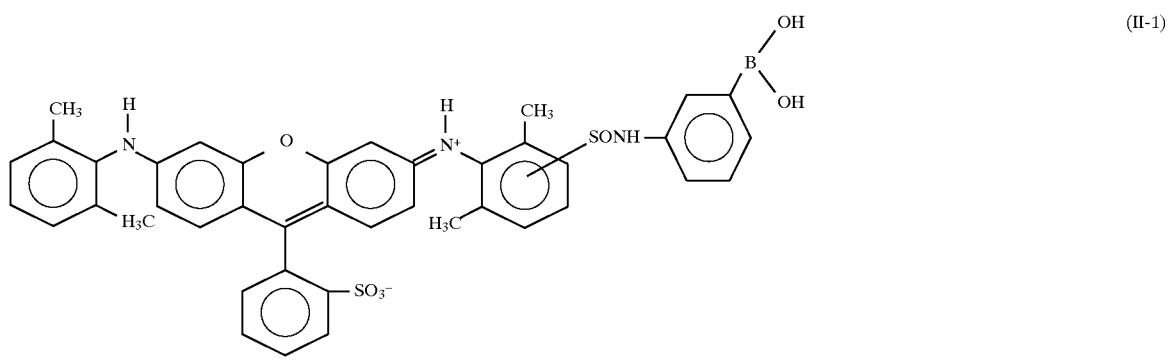

(II-1)

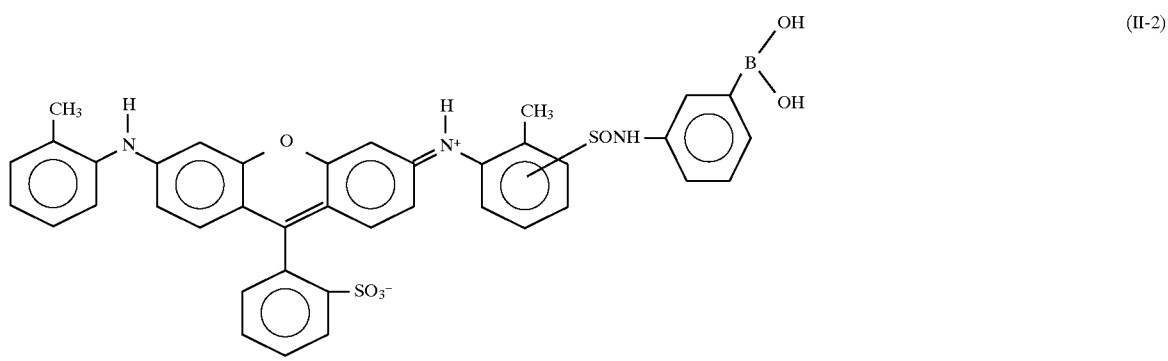

(II-2)

-continued
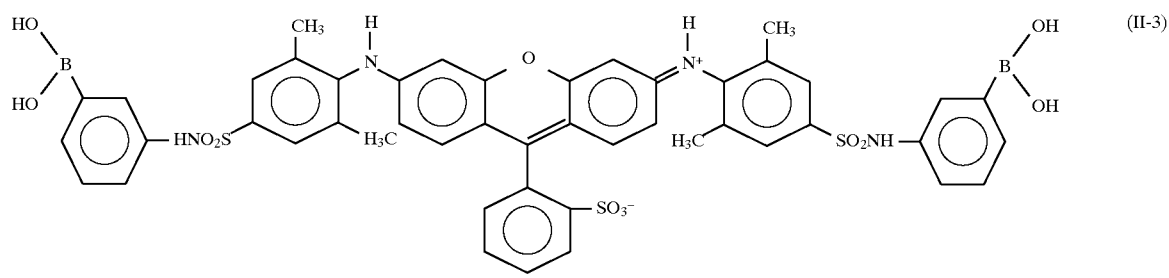
(II-3)
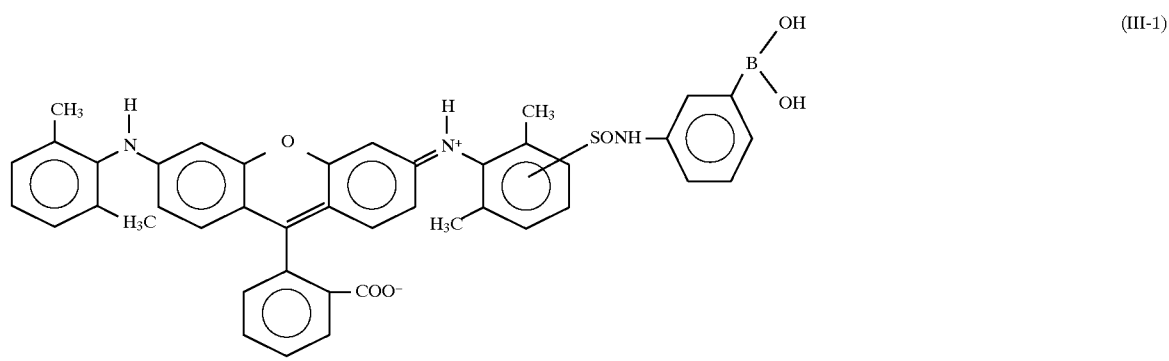
(III-1)
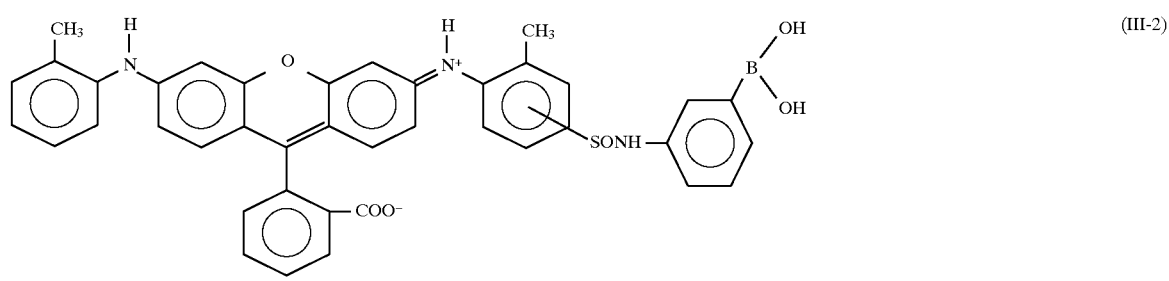
(III-2)
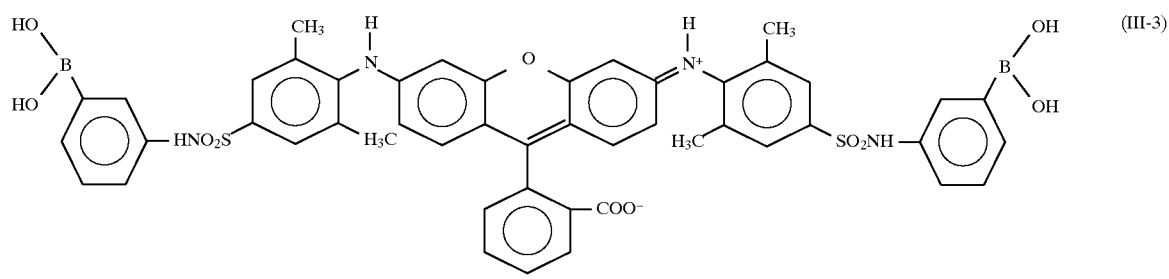
(III-3)
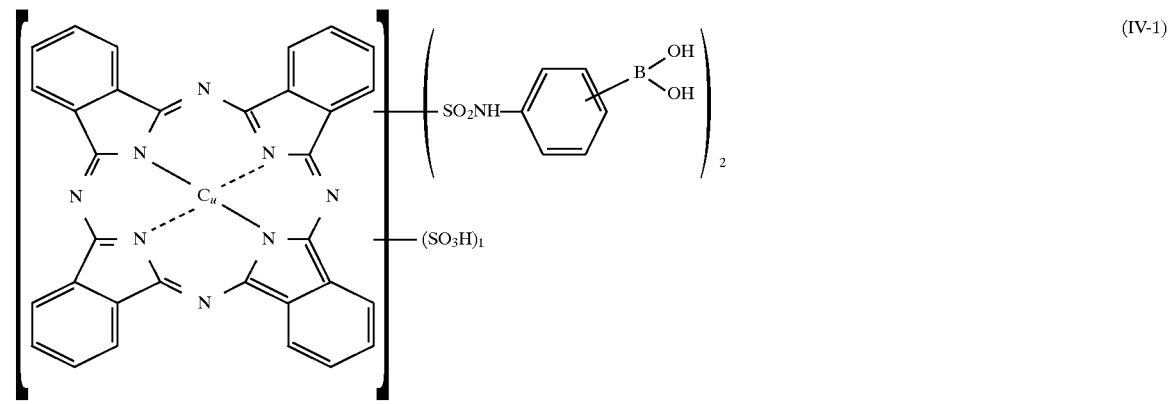
(IV-1)

-continued
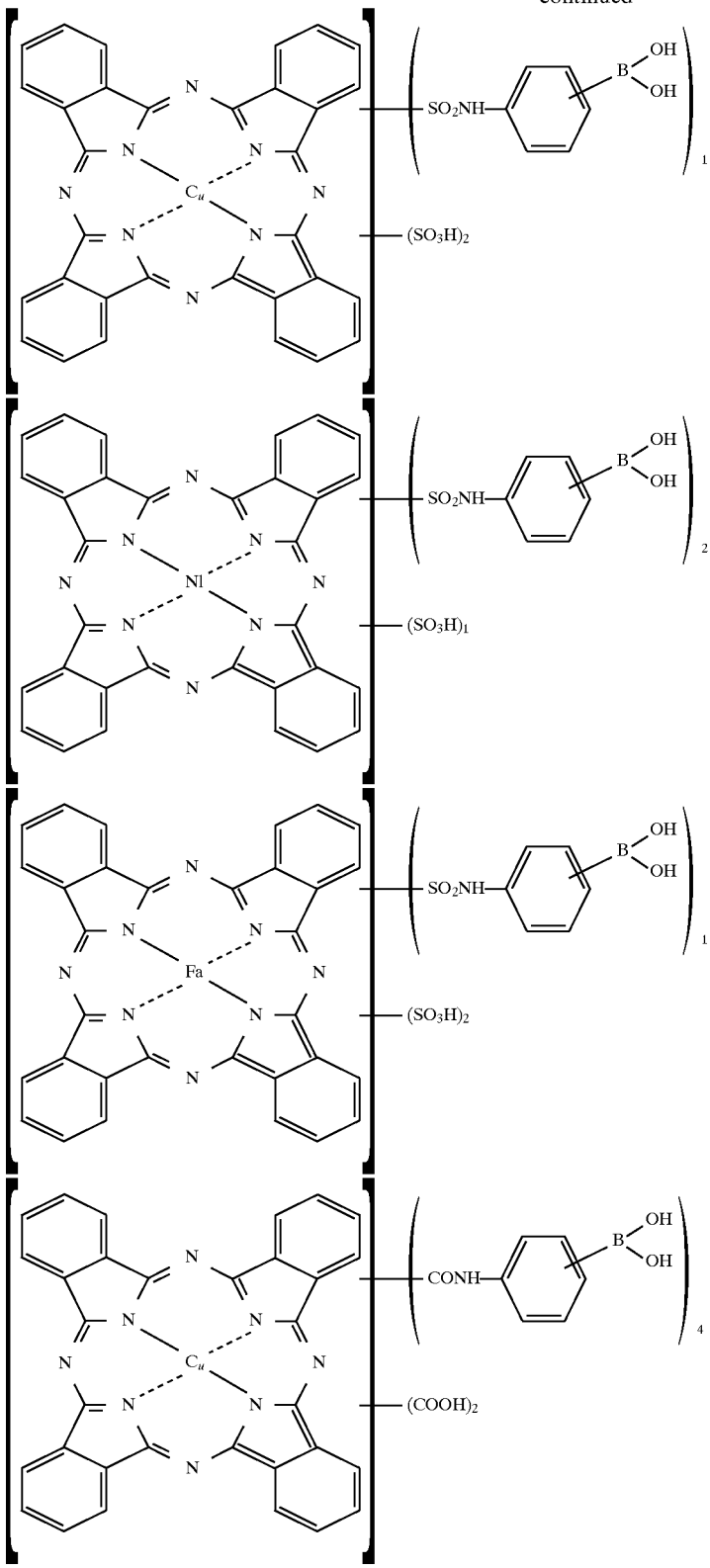
(IV-2)
(IV-3)
(IV-4)
(V-1)

-continued
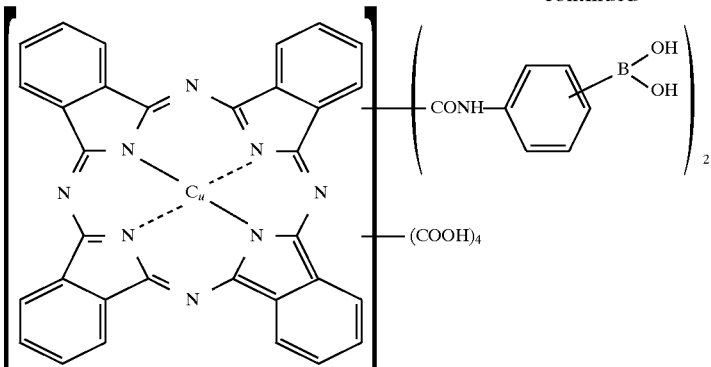 (V-2)
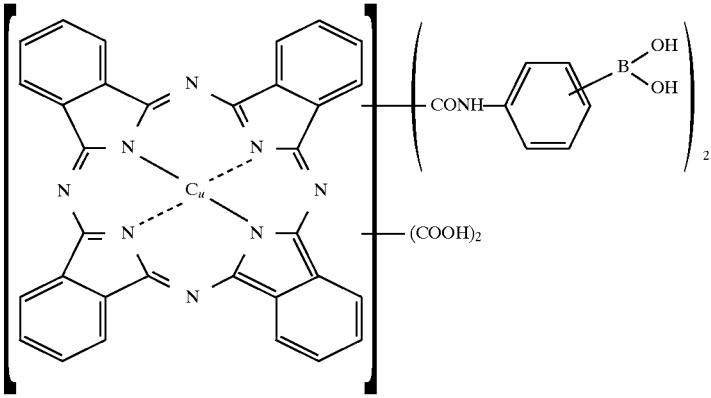 (V-3)
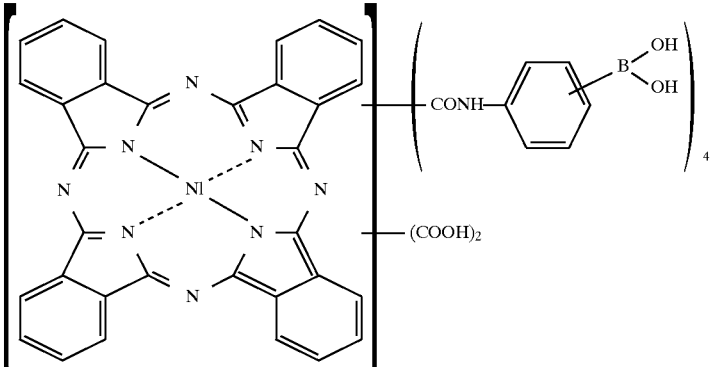 (V-4)
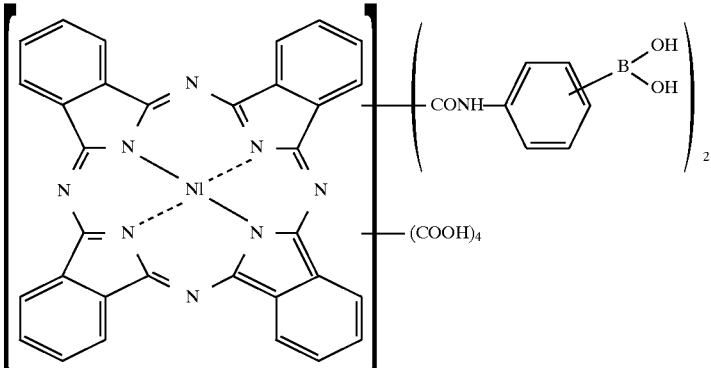 (V-5)

-continued

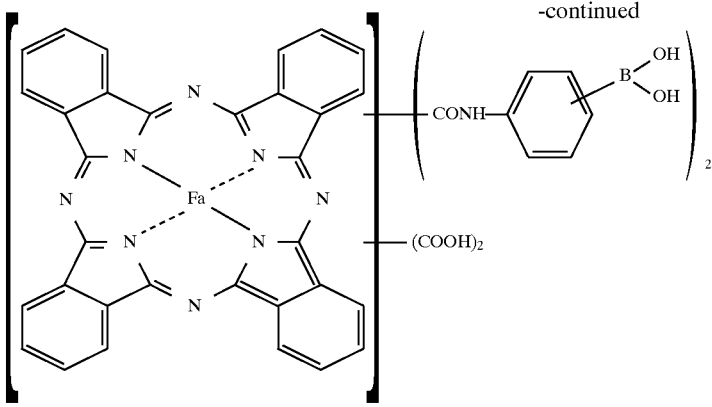
(V-6)

Specific examples of the surfactant of formula (VII) for use in the present invention are shown below in the respective free acid forms:

$CH_3(CH_2)_{12}O(CH_2CH_2O)_3CH_2COOH$ (VII-1)
$CH_3(CH_2)_{12}O(CH_2CH_2O)_4CH_2COOH$ (VII-2)
$CH_3(CH_2)_{12}O(CH_2CH_2O)_5CH_2COOH$ (VII-3)
$CH_3(CH_2)_{12}O(CH_2CH_2O)_6CH_2COOH$ (VII-4)

$CH_3(CH_2)_{11}\underset{\underset{CH_3}{|}}{C}HO(CH_2CH_2O)_6CH_2COOH$ (VII-5)

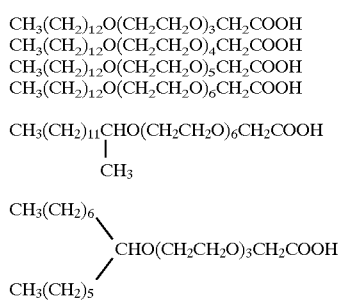
(VII-6)

Specific examples of the surfactant of formula (VIII) for use in the present invention are shown below in the respective free acid forms:

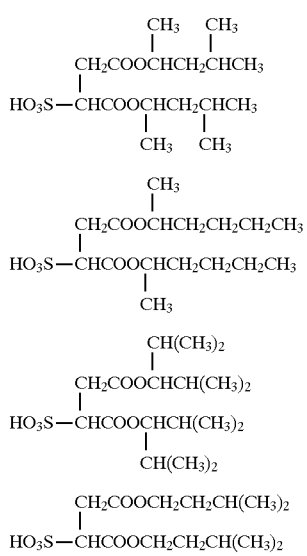

(VIII-1), (VIII-2), (VIII-3), (VIII-4)

In order to impart solubility stability to the water-soluble dyes and the surfactants for use in the present invention during the preservation of the aqueous ink composition of the present invention, or in order to increase the ejection stability when ejecting the ink composition in the form of droplets for recording with the application of thermal energy to the ink composition, it is preferable that the counter ions for the water-soluble dyes and the surfactants for use in the present invention be a cation selected from the group consisting of lithium cation, sodium cation, the previously mentioned quaternary ammonium cation, alkanolamine cation, and quaternary phosphonium cation.

For example, a water-soluble dye or surfactant in the form of a lithium salt is produced by adding lithium hydroxide to a free acid corresponding to the water-soluble dye or surfactant.

For the formation of the quaternary ammonium cations of formula (VI-1), alkanolamine cations of formula (VI-2), and phosphonium cations of formula (VI-3), for example, the following hydroxides can be employed:

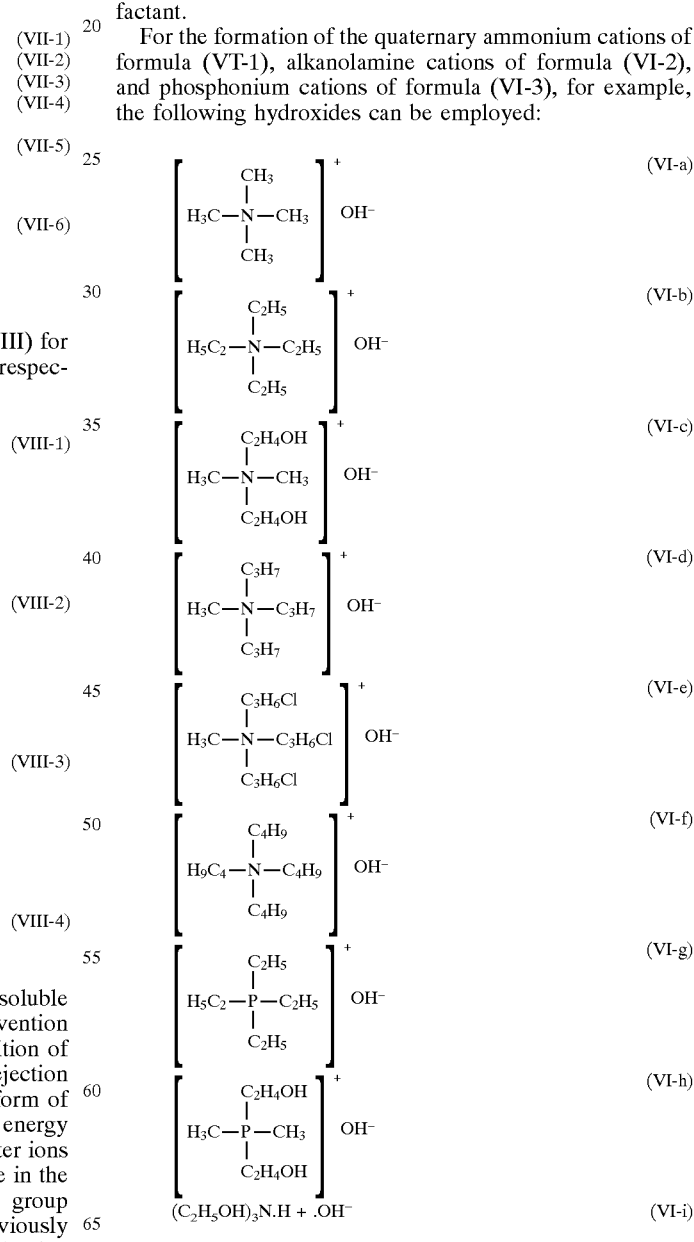

However, it is not always required that all of the counter ions for the water-soluble dyes and the surfactants for use in the present invention be a cation selected from the group consisting of lithium cation, sodium cation the previously mentioned quaternary ammonium cation of formula (VI-1), alkanolamine cation of formula (VI-2), and quaternary phosphonium cation of formula (VI-3). Other alkali ions may also be added thereto.

The aqueous ink composition of the present invention comprises water as a liquid medium To impart the desired physical properties to the aqueous ink composition, to prevent the ink composition from drying, and to improve the solubility stability of the compounds employed in the ink composition, water-soluble organic solvents can be employed in the present invention.

Examples of the water-soluble organic solvents are polyhydric alcohols such as ethylene glycol, diethylene glycol, triethylene glycol, polyethylene glycol, poly-propylene glycol, 1,5-pentanediol, 1,6-hexanediol, glycol, 1,2,6-hexanetriol, 1,2,4-butanetriol, 1,2,3-butanetriol, and 3-methylpentane-1,3,5-triol- alkyl ethers derived from polyhydric alcohols such as ethylene glycol monoethyl ether, ethylene glycol monobutyl ether, diethylene glycol monoethyl ether, diethylene glycol monoethyl ether, diethylene glycol monobutyl ether, tetraethylene glycol monoethyl ether, and propylene glycol monoethyl ether; aryl ethers derived from polyhydric alcohols such as ethylene glycol monophenyl ether, and ethylene glycol monobenzyl ether; nitrogen-containing heterocyclic compounds such as N-methyl-2-pyrrolidone, N-hydroxyethyl-2-pyrrolidone, 2-pyrrolidone, 1,3-dimethylimida-zolidinone, and ecaprolactam; amides such as formamide, N-methylformamide, and N,N-dimethylformamide; amines such as monoethanol amine, diethanol amine, triethanol amine, monoethylamine, diethyl amino, and triethyl amine; sulfur-containing compounds such as dimethyl sulfoxide, sulfolane, and thiodiethanol; propylene carbonate; ethylene carbonate; and γ-butyrolactam. These organic solvents can be employed alone or in combination when used together with water.

Of the above water-soluble organic solvents, diethylene glycol, thiodiethanol, polyethylene glycol (200) to (600), triethylene glycol, glycerol, 1,2,6-hexanetriol, 1,2,4-butanetriol, 3-methylpentane-1,3,5-triol, 1,5-pentandiol, N-methyl-2-pyrrolidone, N-hydroxyethylpyrrolidone, 2-pyrrolidone, and 1,3-dimethylimidazolidinone are preferable because the solubilities of the compounds employed in the ink composition can be increased, and the decline of the ink-ejecting characteristics, which is caused by the evaporation of a water component from the ink composition, can be effectively prevented.

The aqueous ink composition according to the present invention may further comprise a penetrating agent in addition to the surfactants of formulae (VII) to (X) for adjusting the surface tension of the ink composition.

Specific examples of the penetrating agent include alkyl ethers or aryl ethers derived from polyhydric alcohols such as diethylene glycol monophenyl ether, ethylene glycol monophenyl other, ethylene glycol monoallyl ether, diethylene glycol monophenyl ether, diethylene glycol monobutyl ether, propylene glycol monobutyl ether, and tetraethylene glycol chlorophenyl ether; fluorine-containing surface active agents; and lower alcohols such as ethanol, and 2-propanol. Of the above penetrating agents, diethylene glycol monobutyl ether is particularly suitable for use in the present invention.

The surface tension of the aqueous ink composition of the present invention is an indication of the penetration of the ink composition into paper. In particular, in the present invention, the surface tension indicates a dynamic surface tension of a droplet of the ink composition measured within a short period of time of one second or less after the formation of the surface of a droplet on an image-receiving medium. The dynamic surface tension is entirely different from the so called static surface tension which is measured at a saturation time in equilibrium.

In the present invention, the above-mentioned dynamic surface tension of the aqueous ink composition may be measured by any of the conventional methods, for example, by a method described in Japanese Laid-open Patent Application 63-32372, in which the dynamic surface tension is determined by use of the Wilhelmy's surface balance.

The surface tension of a droplet of the aqueous ink composition of the present invention is preferably 50 mN/m or less, more preferably 40 mN/m nor less, for obtaining excellent drying characteristics.

The dye component for use in the present invention comprises a water-soluble dye of formula (II), (III), (IV) or (V). In addition to such a water-soluble dye, other coloring agents may also be used in combination with any of the above-mentioned water-soluble dyes.

water-soluble dyes used as such other coloring agents in the present invention can be divided into an acid dye, a direct dye, a basic dye, a reactive dye and a food dye, in accordance with the color index numbers thereof and have excellent water-resistance and light-resistance.

Specific examples of the acid dye and the food dye are as follows:

C.I. Acid Yellow 17, 23, 42, 44, 79, 142;
C.I. Acid Red 1, 8, 13, 14, 18, 26, 27, 35, 37, 42, 52, 82, 87, 89, 92, 97, 106, 111, 114, 115, 134, 186, 249, 254, 289;
C.I. Acid Blue 9, 29, 45, 92, 249;
C.I. Acid Black 1, 2, 7, 24, 26, 94;
C.I. Food Yellow 3, 4;
C.I. Food Red 7, 9, 14; and
C.I. Food Black 1, 2.

Specific examples of the direct dye are as follows:

C.I. Direct Yellow 1, 12, 24, 26, 33, 44, 50, 86, 120, 132, 142, 144;
C.I. Direct Red 1, 4, 9, 13, 17, 20, 28, 31, 39, 80, 81, 83, 89, 225, 227;
C.I. Direct Orange 26, 29, 62, 102;
C.I. Direct Blue 1, 2, 6, 15, 22, 25, 71, 76, 79, 86, 87, 90, 98, 163, 165, 199, 202; and
C.I. Direct Black 19, 22, 32, 38, 51, 56, 71, 74, 75, 77, 154, 166, 171.

Specific examples of the basic dye are as follows:

C.I. Basic Yellow 1, 2, 11, 13, 14, 15, 19, 21, 23, 24, 25, 28, 29, 32, 36, 40, 41, 45, 49, 51, 53, 63, 64, 65, 67, 70, 73, 77, 87, 91;
C.I. Basic Red 2, 12, 13, 14, 15, 16, 22, 23, 24, 27, 29, 35, 36, 38, 39, 46, 49, 51, 52, 54, 59, 68, 69, 70, 73, 78, 82, 102, 104, 109, 112;
C.I. Basic Blue 1, 3, 5, 7, 9, 21, 22, 26, 35, 41, 45, 47, 54, 62, 65, 66, 67, 69, 75, 77, 78, 89, 92, 93, 105, 117, 120, 122, 124, 129, 137, 141, 147, 155; and
C.I. Basic Black 2, 8.

Specific examples of the reactive dye are as follows :

C.I. Reactive Black 3, 4, 7, 11, 12, 17;
C.I. Reactive Yellow 1, 5, 11, 13, 14, 20, 21, 22, 25, 40, 47, 51, 56, 65, 67;
C.I. Reactive Red 1, 14, 17, 25, 26, 32, 37, 44, 46, 55, 60, 66, 74, 79, 96, 97; and
C.I. Reactive Blue 1, 2, 7, 14, 15, 23, 32, 35, 38, 41, 63, 60, 95.

Of these dyes, the acid dyes and the direct dyes are preferably employed in the present invention.

Examples of the pigment serving as the coloring agent in the aqueous ink composition of the present invention are organic pigments such as azo pigments, phthalocyanine pigments, anthraquinone pigments, quinacridone pigments, dioxazine pigments, indigo pigments, thioindigo pigments, perylene pigments isoindolenone pigments, Aniline Black, azomethine pigments, Rhodamine B lake pigments, and carbon black; and inorganic pigments such as iron oxide, titanium oxide, calcium carbonate, barium sulfate, aluminum hydroxide, barium yellow, prussian blue, cadmium red, chrome yellow, and metal powder.

Examples of the pigment dispersant for use in the ink composition of the present invention are natural hydrophobic polymers, for example, vegetable polymers such as gum arabic, tragacanth gum, guar gum, karaya gum, locust bean gum, arabinogalactan, pectin, and quince seed starch; seaweed polymers such as alginic acid, carrageenan, and agar; animal polymers such as gelatin, casein, albumin, collagen; microbial polymers such as xanthene, and dextran; semi-synthetic hydrophobic polymers, for example, cellulose polymers such as methyl cellulose, ethyl cellulose, hydroxyethyl cellulose, hydroxypropyl cellulose, and carboxymethyl cellulose; starch polymers such as starch sodium glycolate, and starch sodium phosphorate; seaweed-based polymers such as sodium alginate, and propyleneglycol alginate; and synthetic hydrophobic polymers, for example, vinyl polymers such as polyvinyl alcohol, polyvinyl pyrrolidone, and polyvinyl methyl ether; noncrosslinked polyacrylamide; polyacrylic acid and acrylic metal salts thereof; acrylic resin such as water-soluble styrene-acrylic resin; water-soluble styrene-maleic acid resin; water-soluble vinylnaphthalene-acrylic resin; water-soluble vinylnaphthalene-maleic acid resin; polyvinyl pyrrolidone; polyvinyl alcohol; an alkaline metal salt of a condensation product of formalin and β-naphthalenesulfonic acid; and polymeric compounds having a side chain with a salt of a cationic functional group such as quaternary ammonium or amino groups.

In addition to the above-mentioned coloring agents and solvents, the aqueous ink composition of the present invention may further comprise conventionally known additives such as an antiseptic agent, a mildewproofing agent, a pH adjustor, a chelate reagent, and a corrosion inhibitor.

For instance, sodium dehydroacetate, Sodium sorbate, sodium 2-pyridinethiol-1-oxide, sodium benzoate, and sodium pentachlorophenol can be employed as the antiseptic agents and mildewproofing agents.

Any materials which have no adverse effect on the obtained ink composition, any by which the aqueous ink composition can be adjusted to pH7 or more can freely be employed as the pH adjustors in the present invention.

Examples of the pH adjustor for use in the present invention are amines such as diethanolamine and triethanolamine; hydroxides of alkaline metals such as lithium hydroxide, sodium hydroxide and potassium hydroxide; other hydroxides such as ammonium hydroxide, quaternary ammonium hydroxide and quaternary phosphonium hydroxide; and carbonates of alkaline metals such as lithium carbonate, sodium carbonate, and potassium carbonate.

Examples of the chelate reagent for use in the aqueous ink composition of the present invention include ethylene diamine tetreacetate, sodium nitrilotriacetate, sodium hydroxyethyl ethylene diamine triacetate, sodium diethylene triamine pentaacetate, and sodium uramil diacetate.

Examples of the corrosion inhibitor are acid sulfite, sodium thiosulfate, ammon thiodiglycollic acid, diisopropyl ammonium nitrite, pentaerythritol tetranitrate, and dicyclohexyl ammonium nitrite.

Furthermore, the aqueous ink composition of the present invention may further comprise a water-soluble ultraviolet absorbing agent, a water-soluble infrared absorbing agent, and a surface active agent according to the application thereof.

Other features of this invention will become apparent in the course of the following description of exemplary embodiments, which are given for illustration of the invention and are not intended to be limiting thereof.

EXAMPLE 1

A mixture of the following components was stirred and dissolved at 60° C.:

|  | wt. % |
| --- | --- |
| Water-soluble Dye (II-1) | 1.5 |
| Glycerol | 5 |
| N-hydroxyethyl pyrrolidone | 5 |
| Compound (VII-1) | 0.8 |
| Sodium dehydroacetate | 0.2 |
| Deionized water | 87.5 |

The above mixture was cooled to room temperature and the pH of the mixture was adjusted to 8.5 by the addition of 10% aqueous solution of lithium hydroxide. The thus obtained mixture was filtered through a Teflon filter, so that an aqueous ink composition No. 1 according to the present invention was obtained.

EXAMPLE 2

A mixture of the following components was stirred and dissolved at 60° C.:

|  | wt. % |
| --- | --- |
| Water-soluble Dye (III-1) | 1.5 |
| C.I. Direct Red 227 | 0.5 |
| 1,2,6-hexanetriol | 4 |
| 1,5-pentanediol | 8 |
| Compound (VIII-1) | 1.2 |
| 25% aqueous solution of Hydroxide (VI-1) | 0.8 |
| Sodium 2-pyridinethiol-1-oxide | 0.2 |
| Deionized water | 83.8 |

The above mixture was cooled to room temperature and the pH of the mixture was adjusted to 8.8 by the addition of 10% aqueous solution of sodium hydroxide. The thus obtained mixture was filtered through a Teflon filter, so that an aqueous ink composition No. 2 according to the present invention was obtained.

EXAMPLE 3

A mixture of the following components was stirred and dissolved at 60° C.:

|  | wt. % |
| --- | --- |
| Water-soluble dye (II-3) | 1 |
| C.I. Direct Blue 199 | 1.2 |
| Diethylene glycol | 5 |
| Glycerol | 5 |
| Compound of formula (IX) (in which R is $C_9H_{19}$ and | 2 |

|                                              | wt. % |
| -------------------------------------------- | ----- |
| k is 12)                                     |       |
| 25% aqueous solution of Compound (VI-3)      | 0.2   |
| Sodium dehydroacetate                        | 0.2   |
| Deionized water                              | 85.4  |

The above mixture was cooled to room temperature and the pH of the mixture was adjusted to 8.5 by the addition of 10% aqueous solution of lithium hydroxide. The thus obtained mixture was filtered through a Teflon filter, so that an aqueous ink composition No. 3 according to the present invention was obtained.

EXAMPLE 4

A mixture of the following components was stirred and dissolved at 60° C.:

|                                                        | wt. % |
| ------------------------------------------------------ | ----- |
| Water-soluble dye (II-2)                               | 1.2   |
| Ethylene glycol                                        | 5     |
| Glycerol                                               | 2     |
| 1,5-pentanediol                                        | 10    |
| Surfactant of formula (X) (in which m and n each is 20) | 0.8   |
| 25% aqueous solution of Compound (VI-4)                | 2     |
| Sodium benzoate                                        | 0.2   |
| Deionized water                                        | 78.8  |

The above mixture was cooled to room temperature and the pH of the mixture was adjusted to 7.5 by the addition of 10% aqueous solution of lithium hydroxide. The thus obtained mixture was filtered through a Teflon filter, so that an aqueous ink composition No. 4 according to the present invention was obtained.

EXAMPLE 5

A mixture of the following components was stirred and dissolved at 60° C.:

|                                                                    | wt. % |
| ------------------------------------------------------------------ | ----- |
| Water-soluble dye (II-2)                                           | 1.2   |
| Water-soluble dye (III-2)                                          | 0.5   |
| Triethylene glycol                                                 | 5     |
| 3-methylpentane-1,3,5-triol                                        | 10    |
| Compound of formula (IX) (in which R is $C_{10}H_{21}$, and k is 10) | 2     |
| 25% aqueous solution of Compound (VI-2)                            | 1.5   |
| Sodium 2-pyridinethiol-1-oxide                                     | 0.2   |
| Deionized water                                                    | 79.6  |

The above mixture was cooled to room temperature and the pH of the mixture was adjusted to 7.8 by the addition of 10% aqueous solution of sodium hydroxide. The thus obtained mixture was filtered through a Teflon filter, so that an aqueous ink composition No. 5 according to the present invention was obtained.

EXAMPLE 6

A mixture of the following components was stirred and dissolved at 60° C.:

|                                              | wt. % |
| -------------------------------------------- | ----- |
| Water-soluble dye (IV-1)                     | 1.5   |
| Propylene glycol                             | 8     |
| Glycerol                                     | 7     |
| Surfactant of formula (X) (in which m + n = 15) | 1     |
| Surfactant of formula (X) (in which m + n = 0)  | 1     |
| 25% aqueous solution of Compound (VI-7)      | 2     |
| Sodium dehydroacetate                        | 0.2   |
| Deionized water                              | 79.3  |

The above mixture was cooled to room temperature and the pH of the mixture was adjusted to 8 by the addition of 10% aqueous solution of lithium hydroxide. The thus obtained mixture was filtered through a Teflon filter, so that an aqueous ink composition No. 6 according to the present invention was obtained.

EXAMPLE 7

A mixture of the following components was stirred and dissolved at 60° C.:

|                          | wt. % |
| ------------------------ | ----- |
| Water-soluble dye (IV-4) | 1.8   |
| N-methyl-2-pyrrolidone   | 8     |
| 1,5-pentanediol          | 8     |
| Compound (VII-4)         | 0.8   |
| Sodium benzoate          | 0.1   |
| Deionized water          | 81.3  |

The above mixture was cooled to room temperature and the pH of the mixture was adjusted to 8 by the addition of 10% aqueous solution of lithium hydroxide. The thus obtained mixture was filtered through a Teflon filter, so that an aqueous ink composition No. 7 according to the present invention was obtained.

EXAMPLE 8

A mixture of the following components was stirred and dissolved at 60° C.:

|                                                                | wt. % |
| -------------------------------------------------------------- | ----- |
| Water-soluble dye (IV-2)                                       | 2.0   |
| Water-soluble dye (V-2)                                        | 0.5   |
| Thiodiethanol                                                  | 5     |
| Glycerol                                                       | 10    |
| Surfactant of formula (IX) (in which R is $C_{10}H_{21}$, and k is 12) | 1.5   |
| Urea                                                           | 1     |
| Sodium benzoate                                                | 0.1   |
| Deionized water                                                | 79.9  |

The above mixture was cooled to room temperature and the pH of the mixture was adjusted to 7.5 by the addition of 10% aqueous solution of lithium hydroxide thereto. The thus obtained mixture was filtered through a Teflon filter, so that an aqueous ink composition No. 8 according to the present invention was obtained.

EXAMPLE 9

A mixture of the following components was stirred and dissolved at 60° C.:

|  | wt. % |
| --- | --- |
| Water-soluble dye (V-4) | 1.5 |
| Water-soluble dye (IV-1) | 1.0 |
| 2-pyrrolidone | 5.0 |
| Glycerol | 15.0 |
| Surfactant of formula (X) (in which m + n = 40) | 1.0 |
| Compound (VIII-2) | 1.0 |
| Hydroxyethyl urea | 0.5 |
| Sodium pentachlorophenol | 0.2 |
| Deionized water | 74.8 |

The above mixture was cooled to room temperature and the pH of the mixture was adjusted to 8 by the addition of 10% aqueous solution of lithium hydroxide. The thus obtained mixture was filtered through a Teflon filter, so that an aqueous ink composition No. 9 according to the present invention was obtained.

EXAMPLE 10

A mixture of the following components was stirred and dissolved at 60° C.:

|  | wt. % |
| --- | --- |
| Water-soluble dye (V-6) | 1.0 |
| Water-soluble dye (IV-3) | 1.0 |
| 2-pyrrolidone | 5.0 |
| Glycerol | 15.0 |
| Surfactant of formula (X) (in which m + n = 40) | 1.0 |
| Compound (VIII-2) | 1.0 |
| Sodium dehydroacetate | 0.2 |
| Deonized water | 75.8 |

The above mixture was cooled to room temperature and the pH of the mixture was adjusted to 8 by the addition of 10% aqueous solution of lithium hydroxide. The thus obtained mixture was filtered through a Teflon filter, so that an aqueous ink composition No. 10 according to the present invention was obtained.

COMPARATIVE EXAMPLE 1

The procedure for the preparation of the aqueous ink composition No. 1 of the present invention in Example 1 was repeated except that the water,soluble dye (II-1) in the formulation for the aqueous ink composition No. 1 in Example 1 was replaced by C.I. Acid Red 35, whereby a comparative aqueous ink composition No. 1 was obtained.

COMPARATIVE EXAMPLE 2

The procedure for the preparation of the aqueous ink composition No. 4 of the present invention in Example 4 was repeated except that the water-soluble dye (III-2) in the formulation for the aqueous ink composition No. 4 in Example 4 was replaced by C.I. Acid Red 289, whereby a comparative aqueous ink composition No. 2 was obtained.

COMPARATIVE EXAMPLE 3

The procedure for the preparation of the aqueous ink composition No. 1 of the present invention in Example 1 was repeated except that the water-soluble dye (II-1) in the formulation for the aqueous ink composition No. 1 in Example 1 was replaced by the following compound;

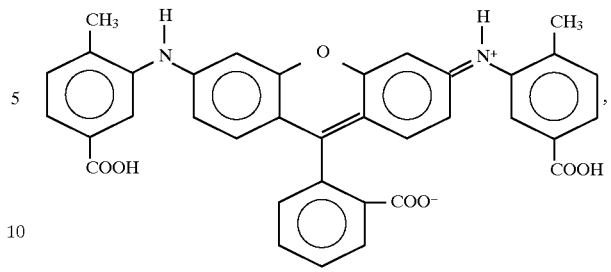

and the pH of the mixture was adjusted to the same pH as in Example 1 by the addition of ammonium hydroxide, whereby a comparative aqueous ink composition No. 3 was obtained.

COMPARATIVE EXAMPLE 4

The procedure for the preparation of the aqueous ink composition No. 6 of the present invention in Example 6 was repeated except that boronic-acid group contained in the compound (IV-1) employed in the formulation for the aqueous ink composition No. 6 in Example 6 was replaced by carboxylic acid, whereby a comparative aqueous ink composition No. 4 was obtained.

The aqueous ink compositions Nos. 1 to 10 of the present invention, respectively prepared in Examples 1 to 10, and the comparative aqueous ink compositions Nos. 1 to 4, respectively prepared in Comparative Examples 1 to 4 were subjected to the following tests:

(1) Image Clearness Inspection Test:

Each aqueous ink composition was separately filled into a thermal ink-jet printer with a head having 300 dpi nozzles with a nozzle diameter of 45 $\mu$m, and also into an ink-jet printer with 300 dpi nozzles with a nozzle diameter of 33 $\mu$m, capable of ejecting the ink composition therefrom by the application of pressure thereto by the action of a piezoelectric element of PZT.

In this test, ink jet printing was conducted on three kinds of papers, that is, recycled paper, high quality paper, and bond paper. The image quality of the printed images was evaluated by visual inspection from the viewpoints of the image blurring, the blurring at the boundaries of a secondary color obtained by superimposing two colored ink compositions, the color tone and the image density.

The results are shown in TABLE 1. Mark "○" denotes that clear images with excellent color tone, free front image blurring, were obtained on all of the three kinds of papers; mark "Δ" denotes that slight image blurring was observed and the color tone thereof was unsatisfactory; and mark "x" denotes that the images were not clear and the color tone thereof was no good.

(2) Water Resistance Inspection Test:

A printed-image-bearing sample obtained by use of each of the aqueous ink compositions was immersed in water at 30° C. for 1 minute, and the image density before the water immersion thereof and that after the water immersion were measured by use of a Macbeth densitomer, and the water resistance of the image obtained by each aqueous ink composition was determined in terms of the fading ratio by percentage:

The results are shown in TABLE 1. Mark "○" denotes that the fading ration was 20% or less; mark "Δ" denotes that the fading ratio was more than 20%, but less than 30%; and mark "x" denotes that the fading ratio was more than 30%.

(3) Drying characteristics inspection tests:

A sheet of filter paper was brought into pressure contact with the printed image immediately after the images were printed on the above-mentioned three kinds of papers. The drying characteristics of the ink compositions were expressed by the time period from the contact of the filter paper with the printed images until no more images were transferred to the filter paper.

In the case where the ink composition was dried and the transfer of the ink composition to the filter paper was finished within 10 seconds with respect to all the three kinds of papers, the drying characteristics of the ink composition were regarded as excellent, which is indicated by mark "○" in TABLE 1; while in the case where the ink composition was not dried and the transfer was not finished within 10 seconds, the drying characteristics of the ink composition were regarded as no good, which is not indicated in TABLE 1.

(4) Measurement of dynamic surface tension:

The dynamic surface tension (mN/m) of each ink composition was measured by the previously mentioned method. The results are shown in TABLE 1.

(5) Preservation stability test:

Four samples of each ink composition were separately placed in a polyethylene container, and allowed to stand at −20° C., 5° C., 20° C. and 70° C. for three months. After the storage of three months, the presence or absence of a precipitate in each sample was visually inspected, and the changes in the physical properties such as the surface tension and viscosity were inspected.

The results are shown in TABLE 1. Mark "○" denotes that no changes in the physical properties were observed under any of the above-mentioned preservation temperature conditions. Mark "x" denotes that some changes in the physical properties were observed under any of the above-mentioned preservation temperature conditions.

(6) Ink-ejection performance reliability test:

Each ink composition was filled into the thermal ink-jet printer. The printing operation was continuously carried out without capping the printer head and also without cleaning the nozzles. The printing operation was resumed after some intermission.

The ink-ejecting reliability of each ink composition was evaluated by the possible intermission time or the decap time (sec.), namely, the time from starting by the printing operation with the nozzles being decapped until the direction in which the ink composition was ejected from one of the decapped nozzles was deviated from its original direction, or by the changes in the weight of the ejected ink droplets. The results are shown in TABLE 1.

TABLE 1

| | Image Clearness | Water Resistance | Drying Characteristics | Dynamic Surface Tension (mN/m) | Preservation Stability | Reliability of Ink-ejection Performance |
|---|---|---|---|---|---|---|
| Ex. 1 | ○ | ○ | ○ | 30 | ○ | 600 or more |
| Ex. 2 | ○ | ○ | ○ | 30 | ○ | 600 or more |
| Ex. 3 | ○ | ○ | ○ | 32 | ○ | 540 |
| Ex. 4 | ○ | ○ | ○ | 30 | ○ | 500 |
| Ex. 5 | ○ | ○ | ○ | 30 | ○ | 580 |
| Ex. 6 | ○ | ○ | ○ | 29 | ○ | 570 |
| Ex. 7 | ○ | ○ | ○ | 29 | ○ | 585 |
| Ex. 8 | ○ | ○ | ○ | 30 | ○ | 510 |
| Ex. 9 | ○ | ○ | ○ | 32 | ○ | 500 |
| Ex. 10 | ○ | ○ | ○ | 30 | ○ | 500 |
| Comp. Ex. 1 | Δ | x | ○ | 30 | ○ | 600 or more |
| Comp. Ex. 2 | ○ | x | ○ | 30 | ○ | 600 or more |
| Comp. Ex. 3 | ○ | ○ | ○ | 30 | x | 560 |
| Comp. Ex. 4 | ○ | Δ | ○ | 30 | ○ | 600 or more |

Japanese Patent Application No. 07-129553 filed Apr. 28, 1995 is hereby incorporated by reference.

What is claimed is:

1. An aqueous ink composition comprising:

a dye component comprising a water-soluble dye selected from the group consisting of a water-soluble xanthene dye and a water-soluble phthalocyanine dye, each of which includes a moiety of formula (I) when said water-soluble dye is in the form of a free acid,

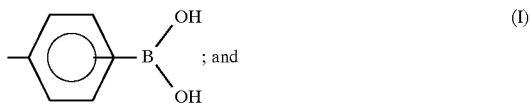

a surfactant.

2. The aqueous ink composition as claimed in claim 1, wherein said dye component comprises at least one water-soluble xanthene dye selected from the group consisting of:

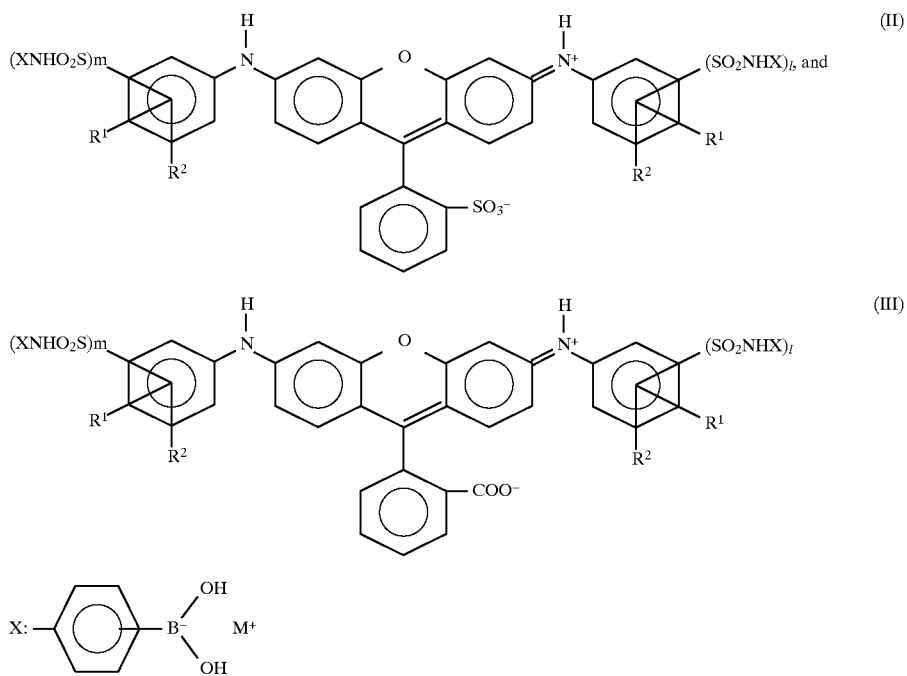

wherein $M^+$ is a cation selected from the group consisting of an alkali metal cation, a quaternary ammonium cation, an alkanolamine cation, and a quaternary phosphonium cation; $R^1$ and $R^2$ each is selected from the group consisting of hydrogen, an alkyl group having 1 to 4 carbon atoms and a halogen; and l and m each is an integer of 0 or 1, provided that l and m cannot be 0 at the same time.

3. The aqueous ink composition as claimed in claim 1, wherein said dye component comprises at least one water-soluble phthalocyanine dye selected from the group consisting of:

wherein $1<x+y\leq4$; Z is selected from the group consisting of hydrogen, Cu, Ni, Fe and Co; $M^+$ is a cation selected from the group consisting of an alkali metal cation, a quaternary ammonium cation, an alkanolamine cation, and a quaternary phosphonium cation; and

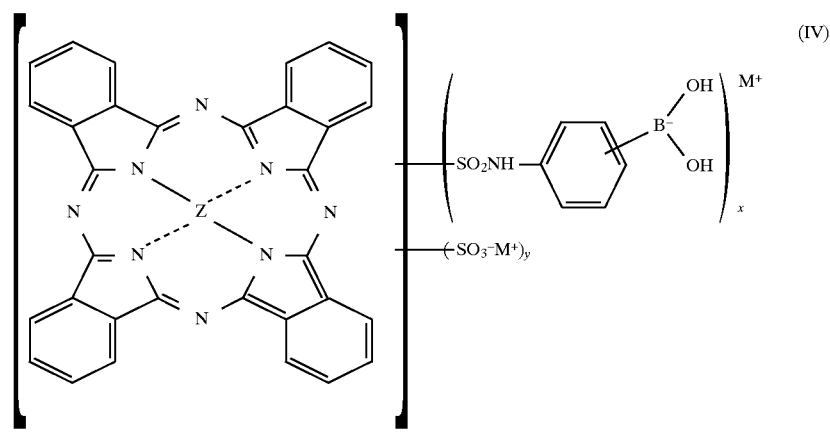

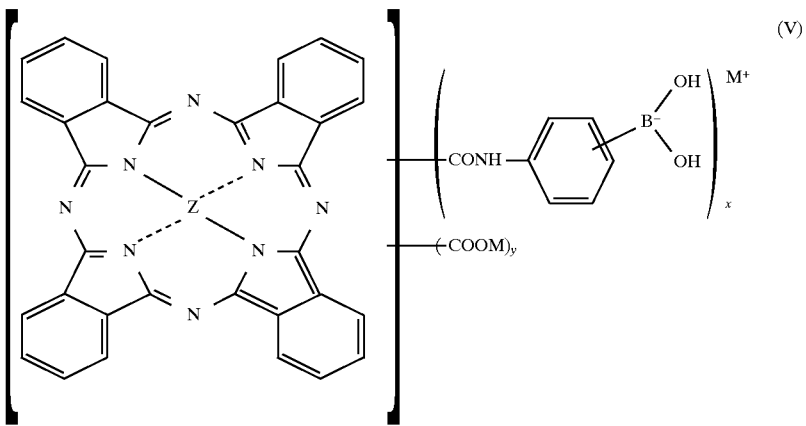

wherein x+y≦8; Z is selected from the group consisting of hydrogen, Cu, Ni, Fe and Co; $M^+$ is a cation selected from the group consisting of an alkali metal cation, a quaternary ammonium cation, a quaternary phosphonium cation, and an alkanolamine cation.

4. The aqueous ink composition as claimed in claim 2, wherein said alkali metal cation represented by $M^+$ is a cation selected from the group consisting of $Na^+$ and $Li^+$.

5. The aqueous ink composition as claimed in claim 2, wherein said quaternary ammonium cation represented by $M^+$ is a cation represented by formula (VI-1):

wherein $R^3$ to $R^6$ each is selected from the group consisting of hydrogen, an alkyl group having 1 to 4 carbon atoms, and a halogenated alkyl group having 1 to 4 carbon atoms.

6. The aqueous ink composition as claimed in claim 2, wherein said alkanolamine cation represented by $M^+$ is a cation represented by formula (VI-2):

wherein at least one of $R^{13}$ to $R^{16}$ is a hydroxyl alkyl group having 1 to 4 carbon atoms, and the other is selected from the group consisting of hydrogen, an alkyl group having 1 to 4 carbon atoms, and a halogenated alkyl group having 1 to 4 carbon atoms.

7. The aqueous ink composition as claimed in claim 2, wherein said quaternary phosphonium cation represented by $M^+$ is a cation represented by formula (VI-3):

wherein $R^{23}$ to $R^{26}$ each is selected front the group consisting of hydrogen, an alkyl group having 1 to 4 carbon atoms, a hydroxy alkyl group having 1 to 4 carbon atoms, and a halogenated alkyl group having 1 to 4 carbon atoms.

8. The aqueous ink composition as claimed in claim 3, wherein said alkali metal cation represented by $M^+$ is a cation selected from the group consisting of $Na^+$ and $Li^+$.

9. The aqueous ink composition as claimed in claim 3, wherein said quaternary ammonium cation represented by $M^+$ is a cation represented by formula (VI-1):

wherein $R^3$ to $R^6$ each is selected from the group consisting of hydrogen, an alkyl group having 1 to 4 carbon atoms, and a halogenated alkyl group having 1 to 4 carbon atoms.

10. The aqueous ink composition as claimed in claim 3, wherein said alkanolamine cation represented by $M^+$ is a cation represented by formula (VT-2):

wherein at least one of $R^{13}$ to $R^{16}$ is a hydroxyl alkyl group having 1 to 4 carbon atoms, and the other is selected from the group consisting of hydrogen, an alkyl group having 1 to 4 carbon atoms, and a halogenated alkyl group having 1 to 4 carbon atoms.

11. The aqueous ink composition as claimed in claim 3, wherein said quaternary phosphonium cation represented by $M^+$ is a cation represented by formula (VT-3):

wherein $R^{23}$ to $R^{26}$ each is selected from the group consisting of hydrogen, an alkyl group having 1 to 4 carbon atoms, a hydroxy alkyl group having 1 to 4 carbon atoms, and a halogenated alkyl group having 1 to 4 carbon atoms.

12. The aqueous ink composition as claimed in claim 1, wherein said surfactant is a polyoxyethylene alkyl ether acetate of formula (VII):

$$R^7-O-(CH_2CH_2O)_m CH_2COOM \qquad (VII)$$

wherein $R^7$ is an alkyl group having 6 to 14 carbon atoms which may be branched; m is an integer of 3 to 12; $M^+$ is a cation selected from the group consisting of an alkali metal cation, a quaternary ammonium cation, a quaternary phosphonium cation, and an alkanolamine cation, which surfactant is added in such an amount that the surface tension of said aqueous ink composition is 50 mN/m or less.

13. The aqueous ink composition as claimed in claim 12, wherein said alkali metal cation represented by $M^{30}$ is a cation selected from the group consisting of $Na^{30}$ and $Li^+$.

14. The aqueous ink composition as claimed in claim 12, wherein said quaternary ammonium cation represented by $M^{30}$ is a cation represented by formula (VI-1):

wherein $R^3$ to $R^6$ each is selected from the group consisting of hydrogen, an alkyl group having 1 to 4 carbon atoms, and a halogenated alkyl group having 1 to 4 carbon atoms.

15. The aqueous ink composition as claimed in claim 12, wherein said alkanolamine cation represented by $M^{30}$ is a cation represented by formula (VI-2):

wherein at least one of $R^{13}$ to $R^{16}$ is a hydroxyl alkyl group having 1 to 4 carbon atoms, and the other is selected from the group consisting of hydrogen, an alkyl group having 1 to 4 carbon atoms, and a halogenated alkyl group having 1 to 4 carbon atoms.

16. The aqueous ink composition as claimed in claim 12, wherein said quaternary phosphonium cation represented by $M^{44}$ is a cation represented by formula (VI-3):

wherein $R^{23}$ to $R^{25}$ each is selected from the group consisting of hydrogen, an alkyl group having 1 to 4 carbon atoms, a hydroxy alkyl group having 1 to 4 carbon atoms, and a halogenated alkyl group having 1 to 4 carbon atoms.

17. The aqueous ink composition as claimed in claim 1, wherein said surfactant is a dialkylsulfosuccinate of formula (VIII):

wherein $R^8$ is a branched alkyl group having 5 to 7 carbon atoms; $M^+$ is a cation selected from the group consisting of an alkali metal cation, a quaternary ammonium cation, a quaternary phosphonium cation, and an alkanol, amine cation, which surfactant is added in such an amount that the surface tension of said aqueous ink composition is 50 mN/m or less.

18. The aqueous ink composition as claimed in claim 17, wherein said alkali metal cation represented by $M^+$ is a cation selected from the group consisting of $Na^+$ and $Li^{30}$.

19. The aqueous ink composition as claimed in claim 17, wherein said quaternary ammonium cation represented by $M^{30}$ is a cation represented by formula (VI-1):

wherein $R^3$ to $R^6$ each is selected from the group consisting of hydrogen, an alkyl group having 1 to 4 carbon atoms, and a halogenated alkyl group having 1 to 4 carbon atoms.

20. The aqueous ink composition as claimed in claim 14, wherein said alkanolamine cation represented by $M^{30}$ is a cation represented by formula (VI-2):

wherein at least one of $R^{13}$ to $R^{16}$ is a hydroxyl alkyl group having 1 to 4 carbon atoms, and the other is selected from the group consisting of hydrogen, an alkyl group having 1 to 4 carbon atoms, and a halogenated alkyl group having 1 to 4 carbon atoms.

21. The aqueous ink composition as claimed in claim 17, wherein said quaternary phosphonium cation represented by $M^{30}$ is a cation represented by formula (VI-3):

wherein $R^{23}$ to $R^{26}$ each is selected from the group consisting of hydrogen, an alkyl group having 1 to 4 carbon atoms, a hydroxy alkyl group having 1 to 4 carbon atoms, and a halogenated alkyl group having 1 to 4 carbon atoms.

22. The aqueous ink composition as claimed in claim 1, wherein said surfactant is a compound of formula (IX):

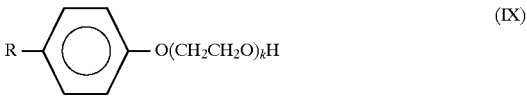

wherein R is an alkyl group having 6 to 14 carbon atoms, which may be branched; and k is an integer of 5 to 12, which surfactant is added in such an amount that the surface tension of said aqueous ink composition is 50 mN/m or less.

23. The aqueous ink composition as claimed in claim 22, further comprising urea or a urea derivative.

24. The aqueous ink composition as claimed in claim 1, wherein said surfactant is a compound of formula (X):

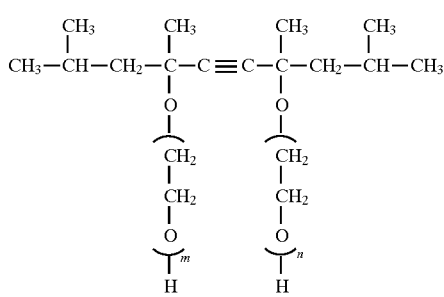

wherein m and n each is an integer of 0 to 40, which surfactant is added in such an amount that the surface tension of said aqueous ink composition is 50 mN/m or less.

25. The aqueous ink composition as claimed in claim 24, further comprising urea or a urea derivative.

26. The aqueous ink composition as claimed in claim 1, having a pH of 6 to 11.

27. The aqueous ink composition as claimed in claim 2, having a pH of 6 to 11.

28. The aqueous ink composition as claimed in claim 3, having a pH of 6 to 11.

29. A method of forming images on an image receiving medium, comprising the step of ejecting an aqueous ink composition in the form of droplets by the application of thermal or mechanical energy thereto onto an image receiving medium with a Stöckigt size degree of 3 seconds or more, with said aqueous ink composition comprising water, a dye component comprising a water-soluble dye selected from the group consisting of a water-soluble xanthene dye and a water-soluble phthalocyanine dye, each of which includes a moiety of formula (I) when said water-soluble dye is in the form of a free acid, and a surfactant:

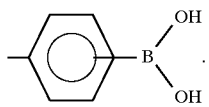

30. The method of forming images on an image receiving medium as claimed in claim 29, wherein said dye component for said aqueous ink composition comprises at least one water-soluble xanthene dye selected from the group consisting of:

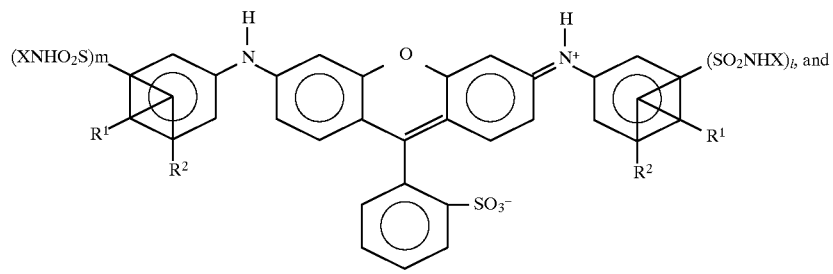

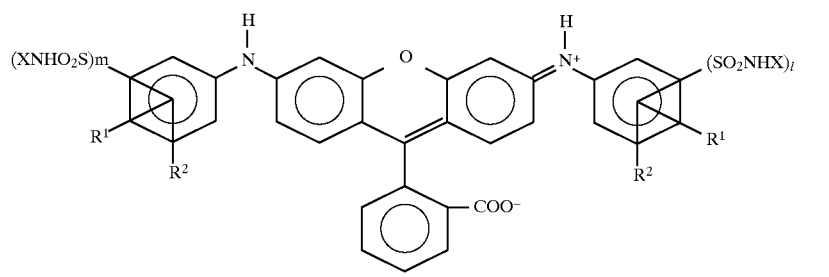

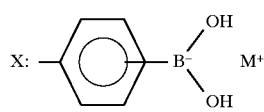

wherein $M^{30}$ is a cation selected from the group consisting of an alkali metal cation, a quaternary ammonium cation, a quaternary phosphonium cation, and an alkanolamine cation; $R^1$ and $R^2$ each is selected from the group consisting of hydrogen, an alkyl group having 1 to 4 carbon atoms and a halogen; and l and m each is an integer of 0 or 1, provided that l and m cannot be 0 at the same time.

31. The method of forming images on an image receiving medium as claimed in claim 29, wherein said dye component for said aqueous ink composition comprises at least one water-soluble phthalocyanine dye selected from the group consisting of:

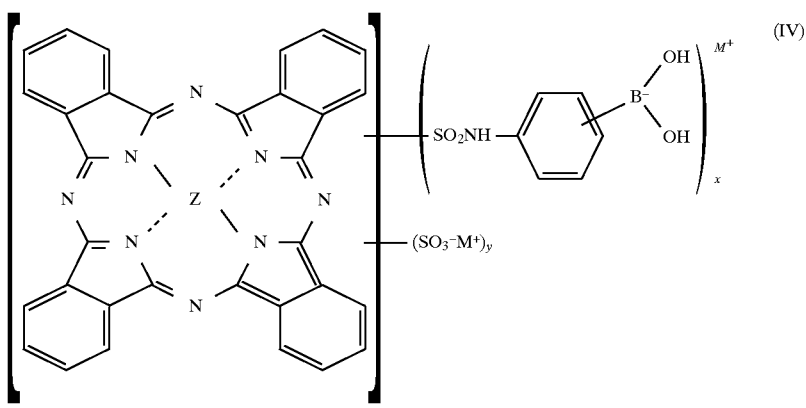

wherein $1 < x+y \leq 4$; Z is selected from the group consisting of hydrogen, Cu, Ni, Fe and Co; $M^{30}$ is a cation selected from the group consisting of an alkali metal cation, a quaternary ammonium cation, a quaternary phosphonium cation, and an alkanolamine cation; and

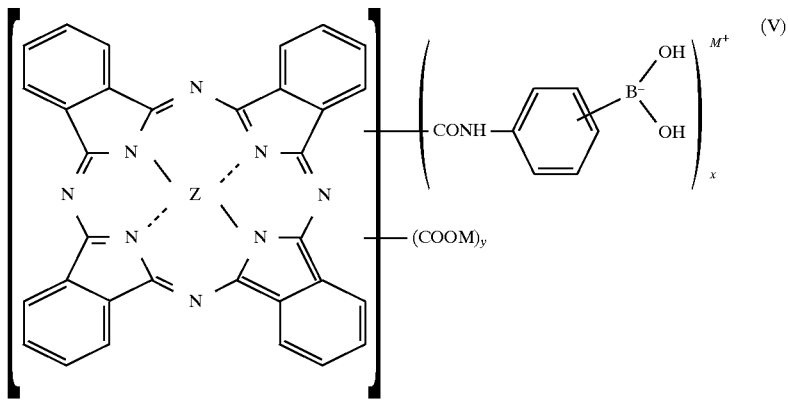

wherein $x+y \leq 8$; Z is selected from the group consisting of hydrogen, Cu, Ni, Fe and Co; $M^+$ is a cation selected from the group consisting of an alkali metal cation, a quaternary ammonium cation, a quaternary phosphonium cation, and an alkanolamine cation.

* * * * *